United States Patent
Liu et al.

(10) Patent No.: US 11,356,959 B2
(45) Date of Patent: Jun. 7, 2022

(54) METHODS AND APPARATUSES FOR POWER CONTROL IN A WIRELESS COMMUNICATION SYSTEM

(71) Applicant: Telefonaktiebolaget LM Ericsson (publ), Stockholm (SE)

(72) Inventors: Jinhua Liu, Beijing (CN); Rui Fan, Beijing (CN); Hai Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 982 days.

(21) Appl. No.: 16/074,085

(22) PCT Filed: Jan. 26, 2018

(86) PCT No.: PCT/CN2018/074338
§ 371 (c)(1),
(2) Date: Jul. 31, 2018

(87) PCT Pub. No.: WO2018/137707
PCT Pub. Date: Aug. 2, 2018

(65) Prior Publication Data
US 2021/0211993 A1    Jul. 8, 2021

(30) Foreign Application Priority Data
Jan. 26, 2017   (WO) ................ PCT/CN2017/072717

(51) Int. Cl.
*H04W 52/34*    (2009.01)
*H04W 76/27*    (2018.01)
(Continued)

(52) U.S. Cl.
CPC ......... *H04W 52/343* (2013.01); *H04W 52/08* (2013.01); *H04W 52/143* (2013.01);
(Continued)

(58) Field of Classification Search
None
See application file for complete search history.

(56) References Cited

U.S. PATENT DOCUMENTS

2005/0025109 A1   2/2005  Ratasuk et al.
2013/0279427 A1*  10/2013 Wentink ............ H04W 74/0816
                                                         370/329
(Continued)

FOREIGN PATENT DOCUMENTS

CN      101043236 A    9/2007
CN      101345552 A    1/2009
(Continued)

OTHER PUBLICATIONS

Extended European Search Report for Application No. 18742894.1, dated Jul. 11, 2019, 9 pages.
(Continued)

*Primary Examiner* — Gregory B Sefcheck
*Assistant Examiner* — Amarnauth G Persaud
(74) *Attorney, Agent, or Firm* — NDWE LLP (57) ABSTRACT

Methods, apparatus and computer program for power control. A method implemented in a terminal device comprises performing power control for at least a first type of traffic based on a first parameter configuration of a first power control loop; and performing power control for at least a second type of traffic based on a second parameter configuration of a second control loop, wherein the first parameter configuration of the first power control loop includes at least one parameter different from the second parameter configuration of the second power control loop.

16 Claims, 5 Drawing Sheets

(51) Int. Cl.
H04W 52/08 (2009.01)
H04W 52/14 (2009.01)
H04W 52/26 (2009.01)
H04W 52/54 (2009.01)

(52) U.S. Cl.
CPC ......... H04W 52/265 (2013.01); H04W 52/54 (2013.01); H04W 76/27 (2018.02)

(56) References Cited

U.S. PATENT DOCUMENTS

| | | | |
|---|---|---|---|
| 2014/0204919 A1 | 7/2014 | Chen et al. | |
| 2018/0110073 A1* | 4/2018 | Mestanov | H04W 74/006 |
| 2019/0373559 A1* | 12/2019 | Davydov | H04W 52/42 |
| 2020/0029203 A1* | 1/2020 | Ekpenyong | H04W 28/18 |
| 2020/0396694 A1* | 12/2020 | Comsa | H04W 52/281 |

FOREIGN PATENT DOCUMENTS

| | | |
|---|---|---|
| CN | 101674613 A | 3/2010 |
| CN | 102781086 A | 11/2012 |
| KR | 10-2015-0111959 A | 10/2015 |

OTHER PUBLICATIONS

Guangdong Oppo Mobile Telecom, "Uplink Power Control for NR," 3GPP TSG RAN WG1 NR-Adhoc, R1-1700553, Jan. 16-20, 2017, Spokane, USA, retrieved from the Internet: http://www.3gpp.org/ftp/Meetings_3GPP_SYNC/RAN1/Docs/, Jan. 16, 2017, 2 pages.

Qualcomm Incorporated, "Interference Mitigation Schemes," 3GPP TSG RAN WG1 Meeting #72, R1-130586, Jan. 28-Feb. 1, 2013, St. Julian's, Malta, retrieved from the Internet: http://www.3gpp.org/ftp/tsg_ran/WG1_RL1/TSGR1_72/Docs/, Jan. 19, 2013, 5 pages.

International Search Report and Written Opinion of Application No. PCT/CN2018/074338, dated Mar. 28, 2018, 9 pages.

CN office action for application # 201880001123.3 dated Aug. 29, 2019 (1 page of English translation and 6 pages of Original document).

Intel Corporation, "Uplink Multiplexing of eMBB and URLLC Transmissions", 3GPP TSG RAN WG1 NR Ad-Hoc Meeting, R1-1700377, Spokane, USA, Jan. 16-20, 2017, 8 pages.

International Preliminary Report on Patentability received for PCT Patent Application No. PCT/CN2018/074338, completed on May 9, 2019, 7 pages.

Huawei, HiSilicon, "General Discussion of UL Power Control for NR", 3GPP TSG RAN WG1 NR Ad Hoc Meeting, R1-1700063, Jan. 16-20, 2017, 5 pages.

Office Action, CN App. No. 201880001123.3, dated Apr. 20, 2020, 6 pages (Original Document Only).

Communication pursuant to Article 94(3) EPC, EP App. No. 18742894.1, dated Oct. 29, 2020, 6 pages.

Notification of Reason for Refusal, KR App. No. 10-2019-7021560, dated Oct. 22, 2020, 14 pages (7 pages of English Translation and 7 pages of Original Document).

Office Action, CA App. No. 3,050,022, dated Sep. 8, 2020, 4 pages.

Office Action, CN App. No. 201880001123.3, dated Jun. 18, 2020 (8 pages of English translation and 6 pages of Original document).

Notification to Grant, CN App. No. 201880001123.3, dated Aug. 17, 2020 (2 pages of English translation and 1 page of Original document).

* cited by examiner

METHODS AND APPARATUSES FOR POWER CONTROL IN A WIRELESS COMMUNICATION SYSTEM

CROSS-REFERENCE TO RELATED APPLICATIONS

This application is a National stage of International Application No. PCT/CN2018/074338, filed Jan. 26, 2018, which claims priority to International Application No. PCT/CN2017/072717, filed Jan. 26, 2017, which are hereby incorporated by reference.

TECHNICAL FIELD

The non-limiting and example embodiments of the present disclosure generally relate to a technical field of wireless communications, and specifically to methods, apparatuses and computer programs for power control in a wireless communication network.

BACKGROUND

This section introduces aspects that may facilitate a better understanding of the disclosure. Accordingly, the statements of this section are to be read in this light and are not to be understood as admissions about what is in the prior art or what is not in the prior art.

Figure 1:
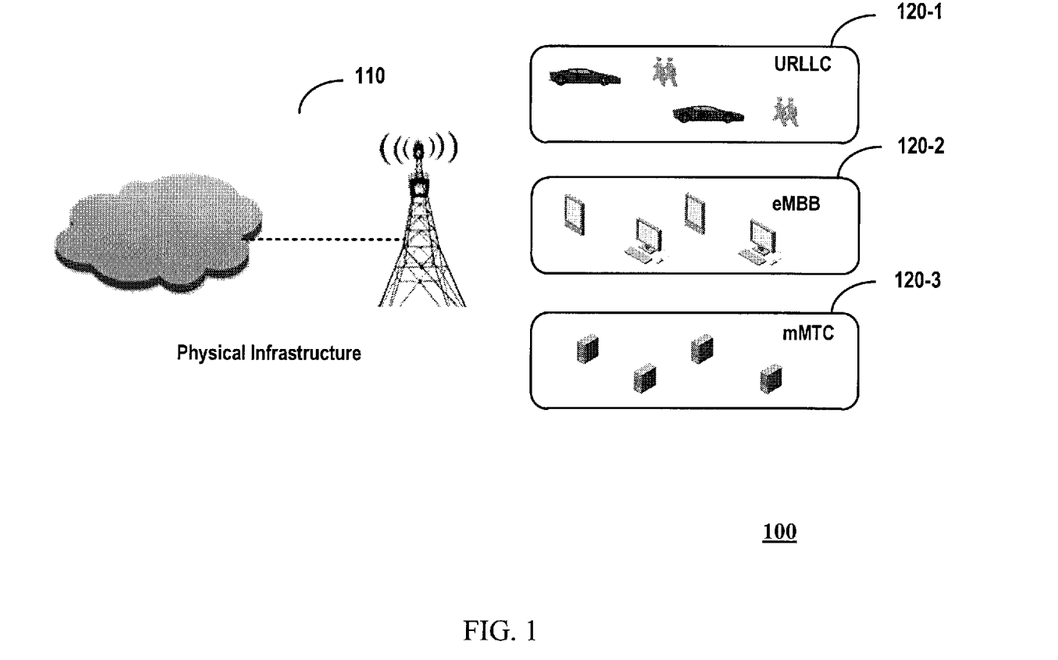
FIG. 1 illustrates an example wireless communication network 100 in which embodiments of the disclosure may be implemented.

Fifth generation (5G) networks such as NR, New Radio are supposed to provide diverse applications or services by using the same physical infrastructure. FIG. 1 schematically shows an example 5G network 100. As illustrated in FIG. 1, the network 100 may support multiple types of mobile network services, e.g., services 120-1, 120-2, 120-3, via a common Radio Access Network (RAN) 110. Those different types of mobile network services 120-1, 120-2, 120-3 are independent one another in a logic level but may be implemented in the same physical infrastructure. Depending on different Quality of Services (QoS) requirements, these mobile network services may be classified into three main types: Ultra-Reliable and Low Latency Communication (URLLC) 120-1, enhanced Mobile BroadBand (eMBB) 120-2, massive Machine Type Communication (mMTC) 120-3.

URLLC 120-1, e.g., being used in automatic drive/automatic control, has strict QoS requirements, especially in terms of latency and reliability. However, such URLLC services usually also has relatively low data rate and possible sparse data transmission.

eMBB 120-2, e.g., being used in HD video service, requires high data rate. Delay can be strict but typically less strict than in URLLC.

mMTC 120-3, e.g., being used in intelligent agriculture, typically supports high connection density and requires long battery lifetime but does not require low delay or high data rate, often combined with small infrequent packets.

In order to fulfil the QoS and delay requirement of different services, uplink transmission power of terminal devices should be controlled properly.

SUMMARY

Therefore, in order to meet the different QoS requirements of the different types of services, it is very important to provide a power control solution for uplink transmission in a wireless communication network.

To solve at least part of the above problem, methods, apparatuses and computer programs are provided in the present disclosure. It can be appreciated that embodiments of the present disclosure are not limited to 5G scenario, but could be more widely applied to any application scenario where similar problems exist.

Various embodiments of the present disclosure mainly aim at providing methods, apparatuses and computer programs for power control. Other features and advantages of embodiments of the present disclosure will also be understood from the following description of specific embodiments when read in conjunction with the accompanying drawings, which illustrate, by way of example, the principles of embodiments of the present disclosure.

According to a first aspect of the present disclosure, there is provided a method implemented at a terminal device. The method comprises: performing power control for at least a first type of traffic based on a first parameter configuration of a first power control loop; and performing power control for at least a second type of traffic based on a second parameter configuration of a second control loop. The first parameter configuration of the first power control loop includes at least one parameter different from the second parameter configuration of the second power control loop.

According to one or more embodiments of the first aspect of the present disclosure, the method may further comprise receiving, from a network device, the first parameter configuration of the first power control loop and the second parameter configuration of the second power control loop via at least one Radio Resource Control, RRC, signaling.

According to one or more embodiments of the first aspect of the present disclosure, the method may further comprise receiving, from a network device, Downlink Control Information, DCI carried in a Physical Downlink Control Channel, PDCCH, wherein the DCI includes either a first power control command for the first power control loop or a second power control command for the second power control loop. The first power control command or the second power control command may be applied to a corresponding power control loop to perform the power control for the respective type of service.

According to one or more embodiments of the first aspect of the present disclosure, the method may further comprise determining with which power control loop the received DCI is associated. In one embodiment, it may be determined based on a length of a time interval that the DCI is used to schedule. In another embodiment, it may be determined based on a search space of the PDCCH carrying the DCI. In yet another embodiment, it may be determined based on information in a field of the received DCI. In yet another embodiment, it may be determined based on a format of the received DCI.

According to one or more embodiments of the first aspect of the present disclosure, the method may comprise receiving, from a network device, a first parameter configuration of the first power control loop and a relative parameter configuration which is indicative of differentiation between the first parameter configuration of the first power control loop and the second parameter configuration of the second power control loop, via at least one RRC signaling.

According to one or more embodiments of the first aspect of the present disclosure, the method may further comprise receiving, from the network device, DCI carried in a PDCCH, wherein the DCI includes a power control command of the first power control loop. The power control command may be applied to either the first or second power control loop depending upon which power control loop the received DCI is associated with.

According to one or more embodiments of the first aspect of the present disclosure, the method may further comprise determining with which power control loop the received DCI is associated. In one embodiment, it may be determined based on a length of a time interval that the DCI is used to schedule. In another embodiment, it may be determined based on a search space of the PDCCH carrying the DCI. In yet another embodiment, it may be determined based on information in a field of the received DCI. In yet another embodiment, it may be determined based on a format of the received DCI.

According to one or more embodiments of the first aspect of the present disclosure, the method may further comprise determining, in response to determining that the received DCI is associated with the second power control loop, the second parameter configuration based on the first parameter configuration and the relative parameter configuration.

According to one or more embodiments of the first aspect of the present disclosure, the first type of traffic may include enhanced Mobile BroadBand, eMBB, traffic and the second type of traffic may include Ultra-Reliable and Low-Latency Communication, URLLC, traffic.

According to a second aspect of the present disclosure, there is provided a method implemented at a network device. The method comprises performing, for a terminal device, power control for at least a first type of traffic based on a first parameter configuration of a first power control loop; and performing, for the terminal device, power control for at least a second type of traffic based on a second parameter configuration of a second control loop, wherein the first parameter configuration of the first power control loop includes at least one parameter different from the second parameter configuration of the second power control loop.

According to one or more embodiments of the second aspect of the present disclosure, the method may further comprise sending, to the terminal device, the first parameter configuration of the first power control loop and the second parameter configuration of the second power control loop via at least one RRC signaling.

According to one or more embodiments of the second aspect of the present disclosure, the method may further comprise receiving, from the terminal device, a Physical Uplink Shared CHannel, PUSCH; determining a first power control command of the first power control loop or a second parameter configuration of the second power control loop based on the received PUSCH.

According to one or more embodiments of the second aspect of the present disclosure, it may be further determined with which power control loop the PUSCH is associated. In one embodiment, it may be determined based on a length of a time interval in which the PUSCH is transmitted. In another embodiment, it may be determined based on a timing relationship between an uplink grant and the PUSCH. In yet another embodiment, it may be determined based on a logical channel identifier in a Medium Access Control, MAC, header borne in the PUSCH.

According to one or more embodiments of the second aspect of the present disclosure, the method may further comprise sending, to the terminal device, DCI in a PDCCH, wherein the DCI includes either the first power control command of the first power control loop or the second power control command of the second power control loop depending upon which power control loop the DCI is associated with.

According to one or more embodiments of the second aspect of the present disclosure, the method may further comprise sending, to a terminal device, a first parameter configuration of the first power control loop and a relative parameter configuration which is indicative of differentiation between the first parameter configuration of the first power control loop and the second parameter configuration of the second power control loop, via at least one RRC signaling.

According to one or more embodiments of the second aspect of the present disclosure, the method may further comprise receiving, from the terminal device, a PUSCH; determining a power control command of the first power control loop based on the received PUSCH.

According to one or more embodiments of the second aspect of the present disclosure, the method may further comprise sending, to the terminal device, DCI carried in a PDCCH, wherein the DCI includes the power control command of the first power control loop.

According to one or more embodiments of the second aspect of the present disclosure, the first type of traffic may include eMBB traffic and the second type of traffic may include URLLC traffic.

According to a third aspect of the present disclosure, there is provided a terminal device. The terminal device comprises a first power control unit, configured to perform power control for at least a first type of traffic based on a first parameter configuration of a first power control loop; a second power control unit, configured to perform power control for at least a second type of traffic based on a second parameter configuration of a second control loop, wherein the first parameter configuration of the first power control loop includes at least one parameter different from the second parameter configuration of the second power control loop.

According to a fourth aspect of the present disclosure, there is provided a network device. The terminal device comprises: a first power control unit, configured to perform, for a terminal device, power control for at least a first type of traffic based on a first parameter configuration of a first power control loop; a second power control unit, configured to perform, for the terminal device, power control for at least a second type of traffic based on a second parameter configuration of a second control loop, wherein the first parameter configuration of the first power control loop includes at least one parameter different from the second parameter configuration of the second power control loop.

According to a fifth aspect of the present disclosure, there is provided a terminal device. The terminal device comprises a processor and a non-transitory machine readable storage medium. The non-transitory machine readable storage medium contains instructions that, when executed on the processor, cause the terminal device to perform the method according to an embodiments of the first aspect of the present disclosure.

According to a sixth aspect of the present disclosure, there is provided a network device. The network device comprises a processor and non-transitory machine readable storage medium. The non-transitory machine readable storage medium contains instructions that, when executed on the processor, cause the network device to perform the method according to an embodiments of the second aspect of the present disclosure.

According to a seventh aspect of the present disclosure, there is provided a computer program, comprising instructions which, when executed on one or more processors, cause the one or more processors to carry out the method of an embodiment of the first aspect of the present disclosure.

According to an eighth aspect of the present disclosure, there is provided a computer program, comprising instructions which, when executed on one or more processors, cause the one or more processors to carry out the method of an embodiment of the second aspect of the present disclosure.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a "first" element could also be referred to as a "second" element, and similarly, a "second" element could also be referred to as a "first" element, without departing from the scope of example embodiments. As used herein, the term "and/or" includes any and all combinations of one or more of the associated listed items.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as LTE-Advanced (LTE-A), LTE, Wideband Code Division Multiple Access (WCDMA), High-Speed Packet Access (HSPA), and so on. Furthermore, the communications between network devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth, depending on the applied terminology and technology.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), portable computers, image capture terminal devices such as digital cameras, gaming terminal devices, music storage and playback appliances, wearable terminal devices, vehicle-mounted wireless terminal devices and the like. In the following description, the terms "terminal device", "terminal", "user equipment" and "UE" may be used interchangeably.

The terminal device may support device-to-device (D2D) communication, for example by implementing a 3GPP standard for sidelink communication, and may in this case be referred to as a D2D communication device.

As yet another specific example, in an Internet of Things (JOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g., refrigerators, televisions, personal wearables such as watches etc. In other scenarios, a terminal device may represent a vehicle or other equipment that is capable of monitoring and/or reporting on its operational status or other functions associated with its operation.

As described above, 5G networks such as NR are designed to support different types of services, which are of quite different performance requirements, such as QoS performance. For example, for eMBB service, its QoS requirement is medium, usually 10% Block Error Rate, BLER, for first transmission is good enough. However, URLLC has very strict requirement on delay and reliability. It is possible that only 1% BLER or even lower target is set for URLLC service. For the above reasons, the required uplink transmission power for URLLC and eMBB service could be quite different.

In the prior art, such as Long Term Evolution, LTE, networks, power control is implemented usually with one power control loop between a terminal device and a network device. For dynamic TDD, it is possible for the terminal device and the network device to run two power control loops. However, in that situation, the two power control loops in dynamic TDD system are differentiated according to type of sub frames. It can be seen that in dynamic TDD system, power control is performed with two power control loops without considering different types of uplink services.

In LTE networks, Physical Uplink Shared CHannel, PUSCH, as well as Physical Uplink Control CHannel, PUCCH, power control needs to be performed between a terminal device and one or more network devices. In LTE, uplink power control is used to compensate for the channel path loss variations. When there is high attenuation between a terminal device and a network device, the terminal device may increase its transmit power in order to maintain the received power at the network device at a desirable level. Otherwise, the terminal device may decrease the transmit power to reduce interference to other terminal devices.

The transmit power for different type of channels follow different power control rules. For example, if the terminal device transmits PUSCH without a simultaneous PUCCH for the serving cell c, then the transmit power $P_{PUSCH,c}(i)$ for PUSCH transmission in subframe i for the serving cell C is given by equation 1):

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\}[dBm] \quad 1)$$

where:
$P_{CMAX,c}$ is the configured UE transmitted power,
$M_{PUSCH,c}(i)$ is the bandwidth of the PUSCH resource assignment expressed in number of resource blocks valid for subframe i and serving cell c, $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c,
$\alpha_c \in \{0, 0.4, 0.5, 0.6, 0.7, 0.8, 0.9, 1\}$ is a 3-bit parameter provided by higher layers for serving cell c,
$PL_c$ is the downlink path-loss estimate calculated in the terminal device for serving cell c in dB,
$\Delta_{TF,c}$ is a dynamic offset given by higher layers,
$f_c(i)$ is a function that represents accumulation of transmitter power control (TPC) commands.

If accumulation is enabled based on the parameter Accumulation-enabled provided by higher layers or if the TPC command $\delta_{PUSCH,c}$ is included in a PDCCH/EPDCCH with DCI format 0 for serving cell c where the cyclic redundancy check (CRC) is scrambled by the Temporary C-RNTI, then
$f_c(i) = \delta_{PUSCH,c}(i - K_{PUSCH})$.
if accumulation is not enabled for serving cell c based on the parameter Accumulation-enabled provided by higher layers, then $f_c(i) = \delta_{PUSCH,c}(i - K_{PUSCH})$.

$\delta_{PUSCH,c}$ is a correction value, also referred to as a TPC command and is included in PDCCH/EPDCCH with DCI format 0/4 for serving cell c or jointly coded with other TPC commands in PDCCH with DCI format 3/3A whose CRC parity bits are scrambled with TPC-PUSCH-RNTI.

For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2.

However, the power control in LTE, as described above, can hardly meet the different performance requirements from URLLC and eMBB service concurrently. For instance, with the same transport format (TF), URLLC service would need a higher transmission power than eMBB service in order to achieve lower BLER target and/or shorter transmission delay. When a terminal device has both eMBB services and URLLC service served by one carrier and one single close loop power control loop is applied to both eMBB and URLLC services, it will hurt URLLC performance when targeting a low quality target (e.g. target of SINR, SIR, SNR, or received power level) optimized for eMBB and hurt the URLLC performance when targeting a high quality target optimized for URLLC.

According to embodiments of the present disclosure, the proposed power control solution is to run at least two different power control loops between the terminal device and the network device, to meet the different performance requirements of different services, such as URLLC and eMBB. The power control loops may be either independent to each other or coupled to each other, so that the power requirements of different types of services can be met.

With reference to FIGS. 2-6, various embodiments of the present disclosure are described. For the purpose of conciseness and clearness, embodiments described below adopt only two power control loops for different types of services. A person skilled in the art could appreciate that more than two power control loops can be run between the terminal device and the network device, which does not depart from the spirit of the present disclosure.

Figure 2:
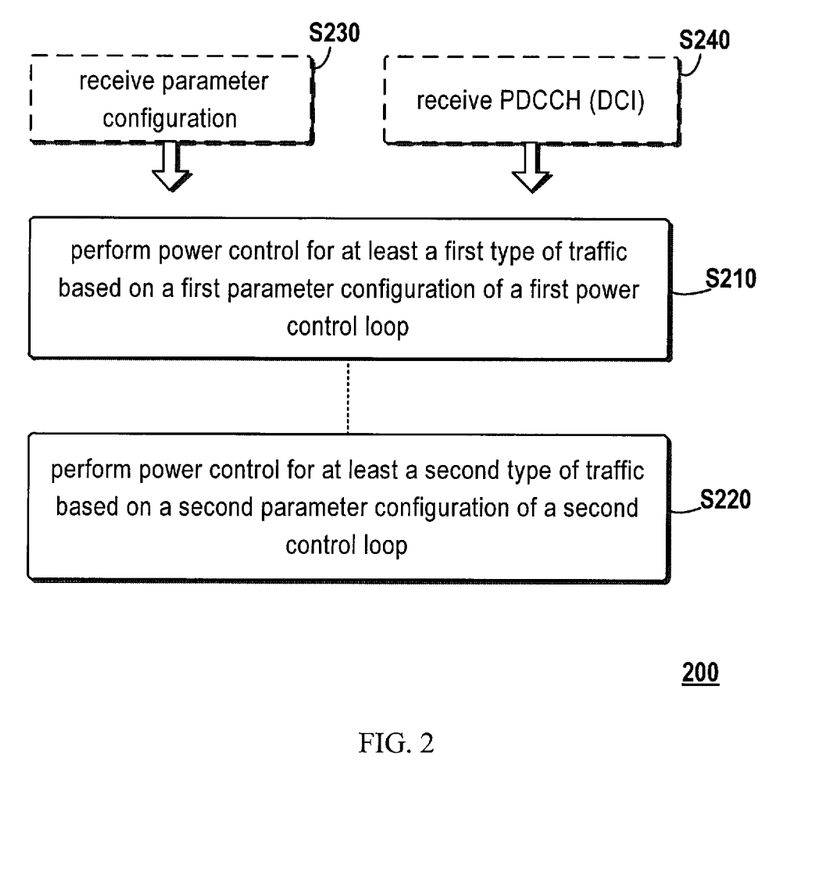
FIG. 2 illustrates a flowchart of a method 200 implemented at a terminal device according to one or more embodiments of the present disclosure.

FIG. 2 illustrates a flowchart of a method 200 implemented at a terminal device according to one or more embodiments of the present disclosure.

As shown in FIG. 2, the terminal device performs, in step S210, power control for at least a first type of traffic based on a first parameter configuration of a first power control loop. The terminal device perform, in step S220, power control for at least a second type of traffic based on a second parameter configuration of a second control loop. The first type of traffic may have different performance requirements (e.g., QoS requirements) from the second type of traffic. To meet the different performance requirements, the first parameter configuration of the first power control loop includes at least one parameter different from the second parameter configuration of the second power control loop. The parameter configuration may be designed to include, for example, semi-statically configured parameters for power control, e.g. the open loop operating point, P0, the path loss compensation factor, alpha, the power control step size and/or other parameters as described in equation 1). It should be noted that the term "traffic" herein means not only data information communications, but also control information as well as reference information communications. The data information communications may include communications on data channels such as PUSCH; the control information communications may include communications on control channels such as PDCCH; and reference information communications may include transmission of Sounding Reference Signaling, SRS.

According to one or more embodiments of the present disclosure, the first type of traffic may be eMBB traffic and the second type of traffic may be URLLC traffic. In 5G networks, since mMTC traffic is delay tolerant, its reliability can be guaranteed by automatic repeat request mechanism, such as Medium Access Control Automatic Repeat ReQest, MAC ARQ and Radio Link Control Automatic Repeat ReQest, RLC ARQ. In one embodiment, mMTC traffic may share the first power control loop with eMBB traffic. That is to say, according to one or more embodiment of the present disclosure, one power control loop may serve several types of services, provided the performance requirements of those services can be met within the one power control loop.

In one or more embodiments of the present disclosure, the first power control loop may operate between the terminal device and network independently of the second power control loop. As such, the terminal device may receive separate parameter configurations for the first and second power control loops, and the dynamic power control related parameters for the first and second power control loops may also be informed from the network device to the terminal device independently.

According to some embodiments where the first power control loop operate independently of the second power control loop, in step S230, the terminal device may receive, from the network device, the first parameter configuration of the first power control loop and the second parameter configuration of the second power control loop via at least one Radio Resource Control, RRC, signaling. The terminal device may be aware of which power control loop the RRC signaling is associated with, by the information carried in the signaling.

According to some embodiments of the present disclosure, the dynamic power control related parameters may be a power control command, such as TPC command, included in Downlink Control Information. In step S240, the terminal device may receive, from the network device, DCI carried in a Physical Downlink Control Channel, PDCCH. The DCI may include either a first power control command for the first power control loop or a second power control command for the second power control loop, depending upon which power control loop the DCI is associated with. That means, separate power control commands are generated and transmitted separately for the power control loops of the terminal device. The dynamic power control related parameter will then be applied to the respective first or second power control loop to perform the power control for the corresponding service(s).

According to a further embodiment, the terminal device may need to determine with which power control loop the received DCI is associated, so as to find out to which power control loop this particular power control command should be applied. There may be different ways for the terminal device to determine this information.

In one embodiment of the present disclosure, the terminal device may determine with which power control loop the received DCI is associated, based on a length of a time interval that the DCI is used to schedule. As an example, in 5G networks, the design principle for eMBB and URLLC is that URLLC needs to transmit data using time interval (also referred as to "Transmission Time Interval, TTI") (either less number of OFDM symbol or numerology with less duration). The terminal device may infer the type of traffic from DCI in PDCCH, and then determine the corresponding power control loop associated with the DCI.

In another embodiment of the present disclosure, the terminal device may determine with which power control loop the received DCI is associated, based on a search space of the PDCCH carrying the DCI. As an example, in 5G networks, the search space of PDCCH for eMBB and URLLC can be different, then according to where PDCCH is detected, the terminal device may infer the type of traffic from DCI in PDCCH, and then determine the power control loop associated with the DCI.

In yet another embodiment, the terminal device may determine with which power control loop the received DCI is associated, based on information in a field of the received DCI.

In yet another embodiment, the terminal device may determine with which power control loop the received DCI is associated, based on a format of the received DCI. Provided in 5G networks different DCI formats are used for URLLC and eMBB respectively, the terminal device can distinguish the power control commands between power control loops according to the DCI format difference. For instance, DCI format a is configured for URLLC, while DCI format b is configured for eMBB, which are scheduling respectively for the terminal device. In this way, the power control loop associated with the DCI is may be determined by directly checking the DCI format a and b.

In one or more embodiments of the present disclosure, the second power control loop may operate between the terminal device and network dependently upon the first power control loop. In 5G networks, for example, eMBB traffic is continuous while URLLC traffic is sporadic, it is reasonable to operate the first power control loop according to eMBB and operate the second power control loop for URLLC dependently upon the first power control loop, so as to save processing resources and transmission payloads. Therefore, the first power control loop and the second power control loop may work dependently or jointly, like there is only one power control loop running which is according to the power control parameters suitable for one type of service, for example, eMBB.

According to some embodiments where the second power control loop operates dependently upon the first power control loop, in step S230, the terminal device may receive, from the network device a first parameter configuration of the first power control loop and a relative parameter configuration which is indicative of differentiation between the first parameter configuration of the first power control loop and the second parameter configuration of the second power control loop, via at least one RRC signaling. Based on this first parameter configuration, the relative parameter configuration, and some predefined rule, the terminal device may calculate the extra power boost for the second type of traffic, such as URLLC.

According to some embodiments of the present disclosure, the dynamic power control related parameters may be a power control command, such as TPC command, included in DCI. In step S240, the terminal device may receive, from the network device, DCI carried in a PDCCH, wherein the DCI includes a power control command of the first power control loop. The power control command may be applied to the first or second power control loop depending upon which power control loop the received DCI is associated with. Specifically, if the DCI is associated with the first power control loop, such as eMBB loop, it will apply the transmission power according the first power control loop. If the DCI is associated with the second power control loop, such as URLLC loop, in addition to the transmission power calculated according to first power control loop, the terminal device may also add an extra power according to the relative parameter configuration for the second power control loop.

In one embodiment of the present disclosure, the terminal device may determine with which power control loop the received DCI is associated, based on a length of a time interval that the DCI is used to schedule. In another embodiment, the terminal device may determine with which power control loop the received DCI is associated, based on a search space of the PDCCH carrying the DCI. In yet another embodiment, the terminal device may determine with which power control loop the received DCI is associated, based on information in a field of the received DCI. In yet another embodiment, the terminal device may determine with which power control loop the received DCI is associated, based on a format of the received DCI.

In response to determining that the received DCI is associated with the second power control loop, the terminal device may determine the second power configuration based on the first parameter configuration and the relative parameter configuration, so as to perform the power control for the second type of traffic.

Figure 3:
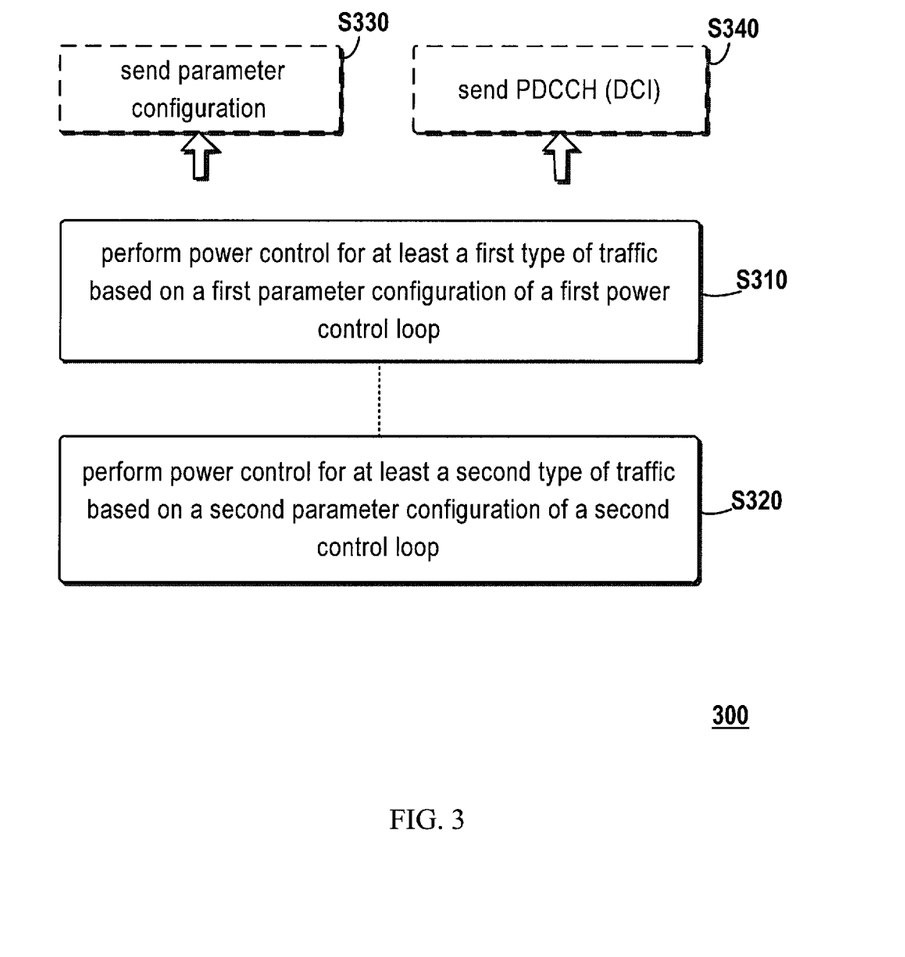
FIG. 3 illustrates a flowchart of a method 300 implemented at a network device according to one or more embodiments of the present disclosure.

FIG. 3 illustrates a flowchart of a method 300 implemented at a network device according to one or more embodiments of the present disclosure.

As shown in FIG. 3, in step S310, the network device performs, for a terminal device, power control for at least a first type of traffic based on a first parameter configuration of a first power control loop. In step S320, the network device performs, for the terminal device, power control for at least a second type of traffic based on a second parameter configuration of a second control loop. The first type of traffic may have different QoS requirements from the second type of traffic. To meet the QoS requirements of the different QoS requirements, the first parameter configuration of the first power control loop includes at least one parameter different from the second parameter configuration of the second power control loop. The parameter configuration may be designed to include, for example, semi-statically configured parameters, e.g. the open loop operating point, P0, the path loss compensation factor, alpha, the power control step size and/or other parameters as described in equation 1).

According to one or more embodiments of the present disclosure, the first type of traffic may be eMBB traffic and the second type of traffic may be URLLC traffic. mMTC traffic may share the first power control loop with eMBB traffic.

In the one or more embodiments where the first power control loop may operate between the terminal device and network independently of the second power control loop, in step S330, the network device may send to the terminal device the first parameter configuration of the first power control loop and the second parameter configuration of the second power control loop via at least one RRC signaling. In step S340, the network device may send, to the terminal device, DCI in a PDCCH, wherein the DCI includes either the first power control command of the first power control loop or the second power control command of the second power control loop depending upon which power control loop the DCI is associated with.

As the network device may need to generate accurate a power control command for each loop independently, the network device has to be aware of the PUSCH or Physical Uplink Control Channel, PUCCH received in uplink is from which power control loop so that the network device can compare the received power to the right target and generate the right dynamic power control command for the corresponding power control loop. According to one or more embodiments, the network device may receive, from the terminal device, a Physical Uplink Shared CHannel, PUSCH, or PUCCH and determine a first power control command of the first power control loop or a second power configuration of the second power control loop based on the received PUSCH or PUCCH. The network device may further determine with which power control loop the PUSCH or PUCCH is associated.

In one embodiment of the present disclosure, the terminal device may determine with which power control loop the PUSCH or PUCCH is associated, based on a length of a time interval in which the PUSCH or PUCCH is transmitted. The network device may check the length in time domain of PUSCH or PUCCH, whether it is transmitted using short TTI or long TTI, provided it is configured that short TTI used for the second type of service, e.g, URLLC and long TTI length used for the first type of service, e.g., eMBB service, the network device can identify which loop the PUSCH or PUCCH corresponds to by checking the length of the time period in which the PUSCH is transmitted.

In another embodiment of the present disclosure, the network device may determine with which power control loop the PUSCH or PUCCH is associated, based on a timing relationship between an uplink grant and the PUSCH or PUCCH. In 5G networks, in principle, there is a shorter time interval between the UL grant transmission and the corresponding PUSCH or PUCCH transmission of shorter TTI. Therefore, by checking the relationship between the uplink grant and the received PUSCH or PUCCH, the network device may identify which power control loop the PUSCH or PUCCH is associated with.

In yet another embodiment of the present disclosure, the network device may determine with which power control loop the PUSCH or PUCCH is associated, based on a logical channel identifier in a Medium Access Control, MAC, header borne in the PUSCH or PUCCH. For example, in 5G networks, URLLC and eMBB traffic belong to different logical channel, NW can also identify the type of PUSCH or PUCCH by checking the logical channel ID in MAC header.

Once the network device is aware of the type of PUSCH or PUCCH, then it can compare the measured power to the right target and generate right control power command. According to some embodiment of the present disclosure, in step S340, the network may send, to the terminal device, DCI in a PDCCH. The DCI may include either the first power control command of the first power control loop or the second power control command of the second power control loop depending upon which power control loop the DCI is associated with.

In one or more embodiments of the present disclosure, the second power control loop may operate between the terminal device and network dependently upon the first power control loop. In 5G networks, for example, eMBB traffic is continuous while URLLC traffic is sporadic, it is reasonable to operate the first power control loop according to eMBB and operate the second power control loop for URLLC dependently upon the first power control loop so as to save processing resources and transmission payloads of signaling. As such, the first power control loop and the second power control loop may work dependently or jointly, like there is only one power control loop running which is according to the power control parameters suitable for one type of service, for example, eMBB.

According to some embodiments wherein the second power control loop operates dependently upon the first power control loop, in step S330, the network device may send, to the terminal device, a first parameter configuration of the first power control loop and a relative parameter configuration which is indicative of differentiation between the first parameter configuration of the first power control loop and the second parameter configuration of the second power control loop, via at least one RRC signaling. Based on this relative parameter configuration, the first parameter configuration, and some predefined rule, the terminal device can calculate the extra power boost for the second type of service, such as URLLC traffic.

In some embodiment of the present disclosure, the network device may receive, from the terminal device, a PUSCH or PUCCH and determine a power control command of the first power control loop based on the received PUSCH or PUCCH.

According to some embodiments, the dynamic power control related parameters may be a power control command, such as TPC command, included in Downlink Control Information. In step S340, the network device may send, to the terminal device, DCI carried in a PDCCH. The DCI may include the power control command generated from the first power control loop. In this embodiment, the control power command generation may be based on the first type of traffic, such as eMBB traffic. The network device may further determine with which power control loop the PUSCH or PUCCH is associated.

In one embodiment, the terminal device may determine with which power control loop the PUSCH or PUCCH is associated, based on a length of a time interval in which the PUSCH or PUCCH is transmitted.

In another embodiment, the network device may determine with which power control loop the PUSCH or PUCCH is associated, based on a timing relationship between an uplink grant and the PUSCH or PUCCH.

In yet another embodiment, the network device may determine with which power control loop the PUSCH or PUCCH is associated, based on a logical channel identifier in a Medium Access Control, MAC, header borne in the PUSCH or PUCCH.

If it is determined that the PUSCH or PUCCH corresponds to the first power control loop for the first type of traffic, such as eMBB traffic, the control power command will be generated by directly comparing the measured power and the target. If it corresponds to the second power control loop for the second type of traffic, such as URLLC traffic, in one embodiment, either no TPC is generated, or in another embodiment, the measured power is first reduced by the offset calculated according to the relative parameter configuration, and then compare to the target to generate the TPC command. In this way, the TPC sent to the terminal device is proper for the first power control loop for the first type of traffic, such as eMBB.

Figure 4:
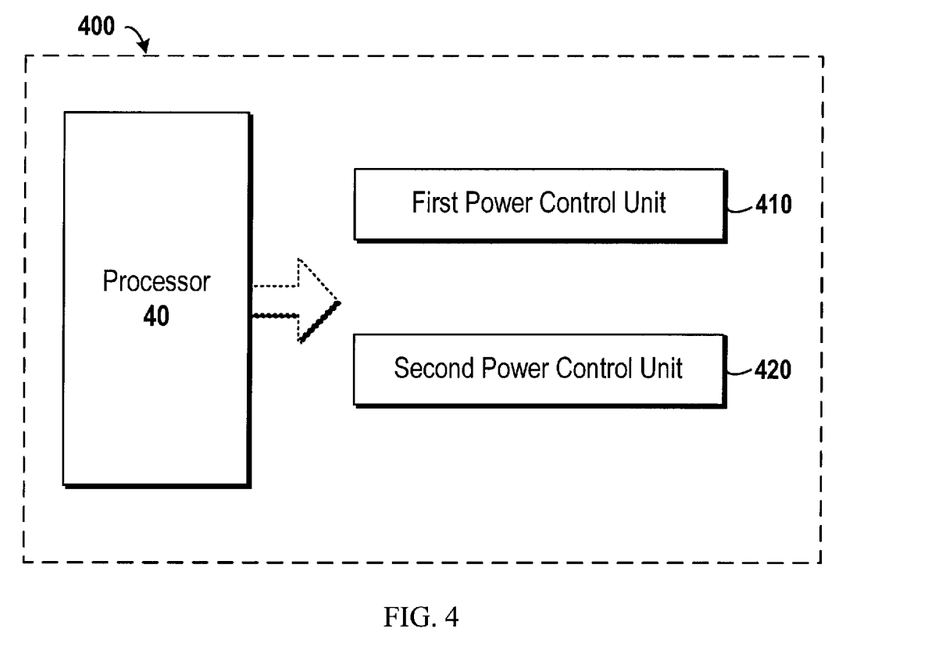
FIG. 4 illustrates a schematic block diagram of an apparatus 400 implemented as/in a terminal device according to one or more embodiments of the present disclosure.

FIG. 4 illustrates a schematic block diagram of an apparatus 400 implemented as/in a terminal device according to one or more embodiment of the present disclosure. As shown in FIG. 4, the terminal device 400, such as UE, is configured to communicate with one or more network devices, such as eNodeB. The terminal device 400 comprises a first power control unit 410, a second power control unit 410. The terminal device 400 may comprise a suitable radio frequency transceiver for wireless communications with one or more network devices via one or more antennas (not shown in FIG. 4). The first power control unit 410 is configured to perform power control for at least a first type of traffic based on a first parameter configuration of a first power control loop. The second power control unit 420 is configured to perform power control for at least a second type of traffic based on a second parameter configuration of a second control loop. The first parameter configuration of the first power control loop includes at least one parameter different from the second parameter configuration of the second power control loop. For example, the first type of traffic may be eMBB traffic and the first power control loop may be adapted to meet the QoS requirements of eMBB traffic. The second type of traffic may be URLLC traffic and the second power control loop may be adapted to meet the QoS requirements of URLLC traffic. In the 5G system, since mMTC traffic is delay tolerant, its reliability can be guaranteed by both MAC ARQ and RLC ARQ. In one embodiment, mMTC traffic may share the first power control loop with eMBB traffic.

In one or more embodiments, the first power control loop and the second power control loop may operate independently to perform power control for respective service traffic. The terminal device 400 may further comprise a receiving unit (not shown in FIG. 4) configured to receive, from a network device, the first parameter configuration of the first power control loop and the second parameter configuration of the second power control loop via at least one RRC signaling. The receiving unit may further receive, from the network device DCI carried in a PDCCH. The DCI may include either a first power control command for the first power control loop or a second power control command for the second power control loop, depending upon which power control loop the received DCI is associated with. The power control command may be applied to the respective first or second power control loop so that the corresponding power control unit 410 or 420 may perform power control based on corresponding parameter configuration and the power command.

According to one or more embodiments of the present disclosure, the terminal device 400 may comprise a determining unit for determining with which power control loop the received DCI is associated. In one embodiment, the determining unit may make such a determination based on a length of a time interval that the received DCI is used to schedule. In another embodiment, the determining unit may make such determination based on a search space of the PDCCH carrying the DCI. In yet another embodiment, the determining unit may rely on information in the field of the received DCI. In yet another embodiment, the determining unit may determine the power control loop with which the DCI is associated, based on the format of the received DCI.

In one or more embodiments, the first power control loop and the second power control loop may operate dependently to perform power control for respective service traffic. That being said, the first power control unit 410 may be directly or indirectly coupled to the second power control unit 420, so that some parameter(s) can be reuse between the two power control loops. The terminal device 400 may further comprise a receiving unit configured to receive, from a network device, a first parameter configuration of the first power control loop and a relative parameter configuration which is indicative of differentiation between the first parameter configuration of the first power control loop and the second parameter configuration of the second power control loop, via at least one RRC signaling. The receiving unit may further receive, from the network device, DCI carried in a PDCCH, wherein the DCI includes a power control command of the first power control loop. The power control command may be applied to the first power control loop or the second power control loop depending upon which power control loop the received DCI is associated with.

According to one or more embodiments of the present disclosure, the terminal device 400 may comprise a determining unit for determining with which power control loop the received DCI is associated. In one embodiment, the determining unit may make such a determination based on a length of a time interval that the received DCI is used to schedule. In another embodiment, the determining unit may make such determination based on a search space of the PDCCH carrying the DCI. In yet another embodiment, the determining unit may rely on information in the field of the received DCI. In yet another embodiment, the determining unit may determine the power control loop with which the DCI is associated, based on the format of the received DCI.

In one embodiment, in response to determining that the received DCI is associated with the second power control loop, the second parameter configuration may be determined based on the first parameter configuration and the relative parameter configuration.

The terminal device 400 may comprise a processor 40, which includes one or more microprocessor or microcontrollers, as well as other digital hardware, which may include digital signal processors (DSPs), special-purpose digital logic, and the like. The processor 40 may be configured to execute program code stored in memory (not shown in FIG. 4), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 40 may be used to cause the first power control unit 410, the second power control unit 420, optionally the receiving unit, the determining (not shown), and any other suitable units of the terminal device 400 to perform corresponding functions according one or more embodiments of the present disclosure.

Figure 5:
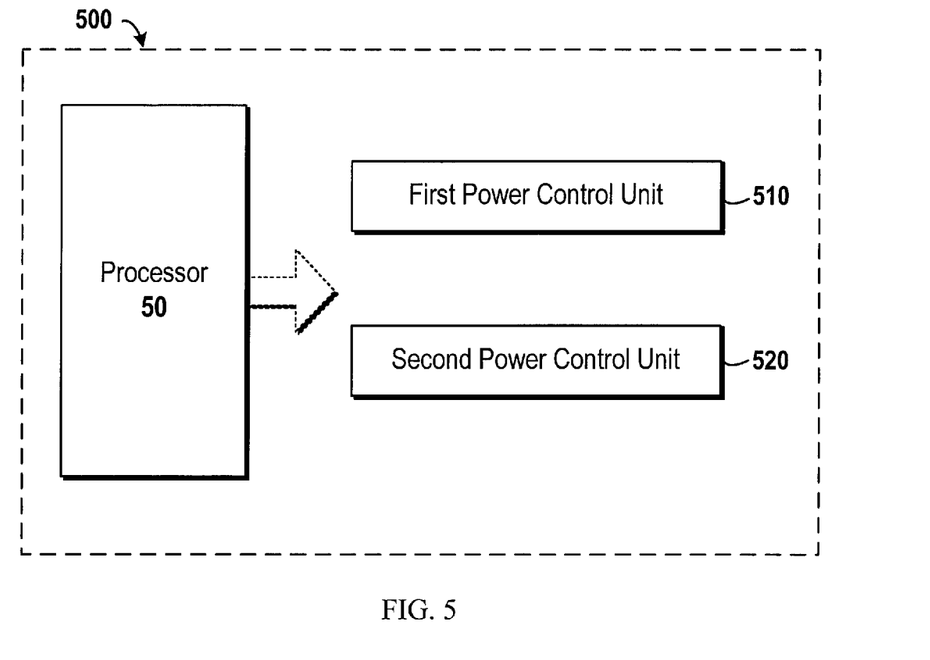
FIG. 5 illustrates a schematic block diagram of an apparatus 500 implemented as/in a network device according to one or more embodiment of the present disclosure.

FIG. 5 illustrates a schematic block diagram of an apparatus 500 implemented as/in a network device according to one or more embodiments of the present disclosure. As shown in FIG. 5, the network device 500, such as eNodeB, is configured to communicate with one or more terminal devices, such as UEs. The network device 500 comprises a first power control unit 510, a second power control unit 520. The network device 500 may comprise a suitable radio frequency transceiver for wireless communications with one or more terminal devices via one or more antennas (not shown in FIG. 5). The first power control unit 510 is configured to perform, for a terminal device, power control for at least a first type of traffic based on a first parameter configuration of a first power control loop. The second power control unit 520 is configured to perform, for the terminal device, power control for at least a second type of traffic based on a second parameter configuration of a second control loop. The first parameter configuration of the first power control loop includes at least one parameter different from the second parameter configuration of the second power control loop. For example, the first type of traffic may be eMBB traffic and the first power control loop may be adapted to meet the QoS requirements of eMBB traffic. The second type of traffic may be URLLC traffic and the second power control loop may be adapted to meet the QoS requirements of URLLC traffic. In the 5G system, since mMTC traffic is delay tolerant, its reliability can be guaranteed by both MAC ARQ and RLC ARQ. In one embodiment, mMTC traffic may share the first power control loop with eMBB traffic.

In one or more embodiments of the present disclosure, the first power control loop and the second power control loop may operate independently to perform power control for respective service traffic. The network device 500 may further comprise a sending unit (not shown in FIG. 5) configured to send, to the terminal device, the first parameter configuration of the first power control loop and the second parameter configuration of the second power control loop via at least one RRC signaling.

According to some embodiments of the present disclosure, the network device 500 may further comprise a receiving unit (not shown in FIG. 5) and a determining unit (not shown in FIG. 5). The receiving unit may be configured to receive, from the terminal device, a PUSCH or PUCCH. The determining unit is configured to determine a first power control command of the first power control loop or a second power configuration of the second power control loop based on the received PUSCH or PUCCH, which is depending upon which power control loop the received PUSCH or PUCCH is associated with. For instance, the determining unit may further determine with which power control loop the PUSCH or PUCCH is associated, based on a length of a time interval in which the PUSCH or PUCCH is transmitted. In another embodiment, the determining unit may make such a determination based on a timing relationship between an uplink grant and the PUSCH or PUCCH. In yet another embodiment, the determining unit may make such a determination based on a logical channel identifier in a Medium Access Control, MAC, header borne in the PUSCH or PUCCH.

According to an embodiment of the present disclosure, the network device 500 may comprise a sending unit configured to send, to the terminal device, DCI in a PDCCH. The DCI may include either the first power control command of the first power control loop or the second power control command of the second power control loop depending upon which power control loop the DCI is associated with.

In one or more embodiments of the present disclosure, the first power control loop and the second power control loop may operate dependently to perform power control for respective service traffic. That being said, the first power control unit 510 may be directly or indirectly coupled to the second power control unit 520, so that some parameter(s) may be reuse between the two power control loops. The network device 500 may further comprise a sending unit configured to send, to the terminal device, a first parameter configuration of the first power control loop and a relative parameter configuration which is indicative of differentiation between the first parameter configuration of the first power control loop and the second parameter configuration of the second power control loop, via at least one RRC signaling.

According to some embodiments, the network device 500 may further comprise a receiving unit (not shown in FIG. 5) and a determining unit (not shown in FIG. 5). The receiving unit may be configured to receiving, from the terminal device, a PUSCH or PUCCH. The determining unit may be configured to determining a power control command of the first power control loop based on the received PUSCH or PUCCH. The power control command may be used to control the power in the first power control loop or the second first power control loop depending upon which power control loop the PUSCH or PUCCH is associated with, although it is generated from the first power control loop. The network device 500 may further comprise a sending unit configured to send, to the terminal device, DCI carried in a PDCCH, wherein the DCI includes the power control command of the first power control loop.

The network device 500 may comprise a processor 50, which includes one or more microprocessor or microcontrollers, as well as other digital hardware, which may include digital signal processors (DSPs), special-purpose digital logic, and the like. The processor 50 may be configured to execute program code stored in memory (not shown in FIG. 5), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 50 may be used to cause the first power control unit 510, the second power control unit 520, optionally the receiving unit, the sending unit, the determining unit (not shown), and any other suitable units of the network device 500 to perform corresponding functions according one or more embodiments of the present disclosure.

Figure 6:
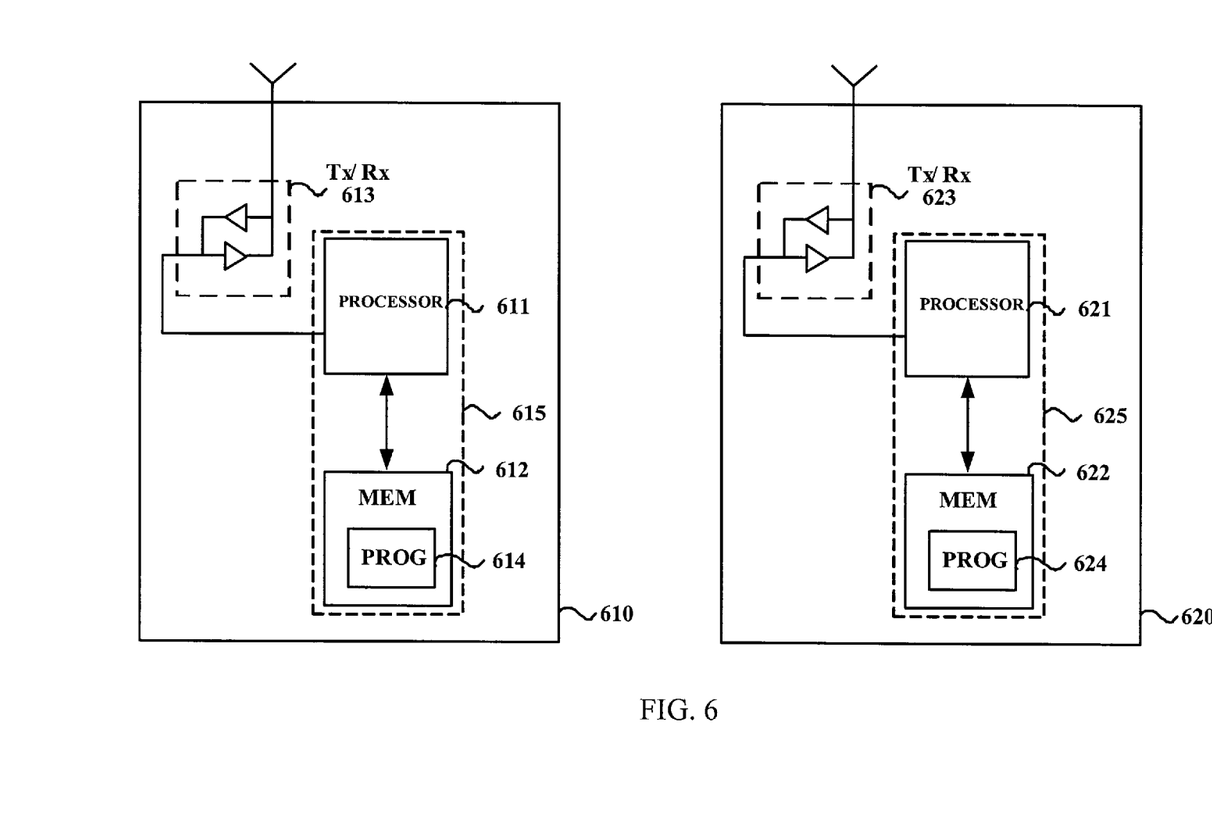
FIG. 6 illustrates a simplified block diagram of an apparatus 610 that may be embodied as/in a terminal device, and an apparatus 620 that may be embodied as/in a network device.

FIG. 6 illustrates a simplified block diagram of an apparatus 610 that may be embodied as/in a terminal device, e.g., the terminal device 400, and an apparatus 620 that may be embodied as/in a network device, e.g., the terminal device 500.

The apparatus 610 may include one or more processors 611, such as a data processor (DP) and one or more memories (MEM) 612 coupled to the processor 611. The apparatus 610 may further include a transmitter TX and receiver RX 613 coupled to the processor 611. The MEM 612 may be non-transitory machine readable storage medium and it may store a program (PROG) 614. The PROG 614 may include instructions that, when executed on the associated processor 611, enable the apparatus 610 to operate in accordance with the embodiments of the present disclosure, for example to perform the method 200. A combination of the one or more processors 611 and the one or more MEMs 612 may form processing means 615 adapted to implement various embodiments of the present disclosure.

The apparatus 620 includes one or more processors 621, such as a DP, and one or more MEMs 622 coupled to the processor 621. The apparatus 620 may further include a suitable TX/RX 623 coupled to the processor 621. The MEM 622 may be non-transitory machine readable storage medium and it may store a PROG 624. The PROG 624 may include instructions that, when executed on the associated processor 621, enable the apparatus 620 to operate in accordance with the embodiments of the present disclosure, for example to perform the method 300. A combination of the one or more processors 621 and the one or more MEMs 622 may form processing means 625 adapted to implement various embodiments of the present disclosure.

Various embodiments of the present disclosure may be implemented by computer program executable by one or more of the processors 611 and 621, software, firmware, hardware or in a combination thereof.

The MEMs 612 and 622 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 611 and 621 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless system supporting scenarios for both URLLC and eMBB services, it should not be construed as limiting the spirit and scope of the present disclosure. The principle and concept of the present disclosure may be more generally applicable to other scenarios.

According to embodiments of the present disclosure, at least two power control loops can be implemented between the terminal device and the network device. As a result, the power control for different types of services can be performed independently or dependently. In this way, the different performance requirements for those services can be guaranteed.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a terminal device, comprising:
   receiving, from a network device via at least one Radio Resource Control (RRC) signaling, a first parameter configuration for power control and a relative parameter configuration which is indicative of differentiation between the first parameter configuration for power control and a second parameter configuration for power control;
   performing power control for at least a first type of traffic based on the first parameter configuration applied to a first power control loop; and
   performing power control for at least a second type of traffic based on the second parameter configuration applied to a second power control loop,
   wherein the first type of traffic and the second type of traffic have different performance requirements related to Quality of Service, in which to meet the different performance requirements, the first parameter configuration includes at least one parameter different from the second parameter configuration.

2. The method according to claim 1, further comprising:
   receiving, from the network device, Downlink Control Information (DCI) carried in a Physical Downlink Control Channel (PDCCH), wherein the DCI includes a power control command,
   wherein the power control command is applied to the first or the second power control loop depending upon which power control loop the received DCI is associated with.

3. The method according to claim 2, further comprising:
   determining with which power control loop the received DCI is associated, based on a length of a time interval that the DCI is used to schedule.

4. The method according to claim 2, further comprising:
   determining with which power control loop the received DCI is associated, based on a search space of the PDCCH carrying the DCI.

5. The method according to claim 2, further comprising:
   determining with which power control loop the received DCI is associated, based on information in a field of the received DCI.

6. The method according to claim 2, further comprising:
   determining with which power control loop the received DCI is associated, based on a format of the received DCI.

7. The method according to claim 2, further comprising:
   in response to determining that the received DCI is associated with the second power control loop, determining the second parameter configuration based on the first parameter configuration and the relative parameter configuration.

8. The method according to claim 1, wherein the first type of traffic includes enhanced Mobile BroadBand (eMBB) data and control information communications and the second type of traffic includes Ultra-Reliable and Low-Latency Communication (URLLC) data and control information communications.

9. A method implemented at a network device, comprising:
- sending, to a terminal device via at least one Radio Resource Control (RRC) signaling, a first parameter configuration for power control and a relative parameter configuration which is indicative of differentiation between the first parameter configuration for power control and a second parameter configuration for power control;
- performing, for the terminal device, power control for at least a first type of traffic based on the first parameter configuration applied to a first power control loop; and
- performing, for the terminal device, power control for at least a second type of traffic based on the second parameter configuration applied to a second power control loop,
- wherein the first type of traffic and the second type of traffic have different performance requirements related to Quality of Service, in which to meet the different performance requirements, the first parameter configuration includes at least one parameter different from the second parameter configuration.

10. The method according to claim 9, further comprising:
- receiving, from the terminal device, a Physical Uplink Shared CHannel (PUSCH) or Physical Uplink Control CHannel (PUCCH); and
- determining a power control command for the first power control loop or a second power control loop based on the received PUSCH or PUCCH.

11. The method according to claim 10, wherein determining the power control command for the first power control loop or the second power control loop based on the received PUSCH or PUCCH further comprises:
- determining with which power control loop the PUSCH or PUCCH is associated, based on a length of a time interval in which the PUSCH or PUCCH is transmitted.

12. The method according to claim 10, wherein determining the first power control command for the first power control loop or the second power control loop based on the received PUSCH or PUCCH further comprises:
- determining with which power control loop the PUSCH or PUCCH is associated, based on a timing relationship between an uplink grant and the PUSCH or PUCCH.

13. The method according to claim 10, wherein determining the power control command for the first power control loop or the second power control loop based on the received PUSCH or PUCCH further comprises:
- determining with which power control loop the PUSCH or PUCCH is associated, based on a logical channel identifier in a Medium Access Control (MAC) header borne in the PUSCH or PUCCH.

14. The method according to claim 9, further comprising:
- sending, to the terminal device, Downlink Control Information (DCI) in a Physical Downlink Control Channel (PDCCH), wherein the DCI includes either a first power control command for the first power control loop or a second power control command for the second power control loop depending upon which power control loop the DCI is associated with.

15. A terminal device comprising:
- a processor; and
- a storage medium containing instructions that, when executed on the processor, cause the terminal device to perform operations to:
  - receive, from a network device via at least one Radio Resource Control (RRC) signaling, a first parameter configuration for power control and a relative parameter configuration which is indicative of differentiation between the first parameter configuration for power control and a second parameter configuration for power control;
  - perform power control for at least a first type of traffic based on the first parameter configuration applied to a first power control loop; and
  - perform power control for at least a second type of traffic based on the second parameter configuration applied to a second power control loop,
  - wherein the first type of traffic and the second type of traffic have different performance requirements related to Quality of Service, in which to meet the different performance requirements, the first parameter configuration includes at least one parameter different from the second parameter configuration.

16. A network device (500) comprising:
- a processor; and
- a storage medium containing instructions that, when executed on the processor, cause the network device to perform operations to:
  - send, to a terminal device via at least one Radio Resource Control (RRC) signaling, a first parameter configuration for power control and a relative parameter configuration which is indicative of differentiation between the first parameter configuration for power control and a second parameter configuration for power control;
  - perform, for the terminal device, power control for at least a first type of traffic based on the first parameter configuration applied to a first power control loop; and
  - perform, for the terminal device, power control for at least a second type of traffic based on the second parameter configuration applied to a second power control loop,
  - wherein the first type of traffic and the second type of traffic have different performance requirements related to Quality of Service, in which to meet the different performance requirements, the first parameter configuration includes at least one parameter different from the second parameter configuration.

* * * * *